March 6, 1945.   T. GALLO   2,370,653
DILUTER FOR MOTOR CRANK CASE LUBRICANTS
Filed Oct. 26, 1942   2 Sheets-Sheet 2
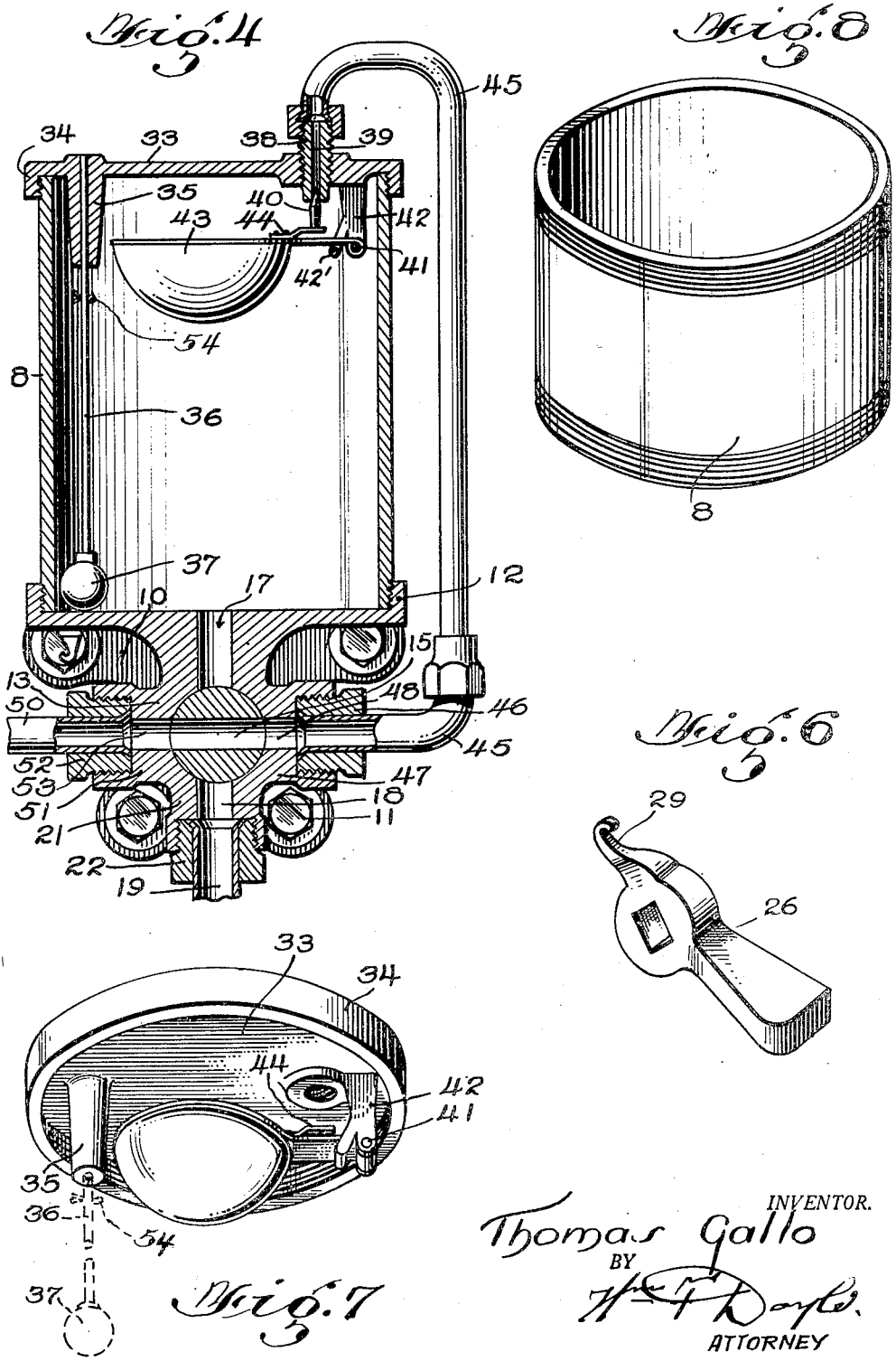
INVENTOR.
Thomas Gallo
BY
ATTORNEY Patented Mar. 6, 1945

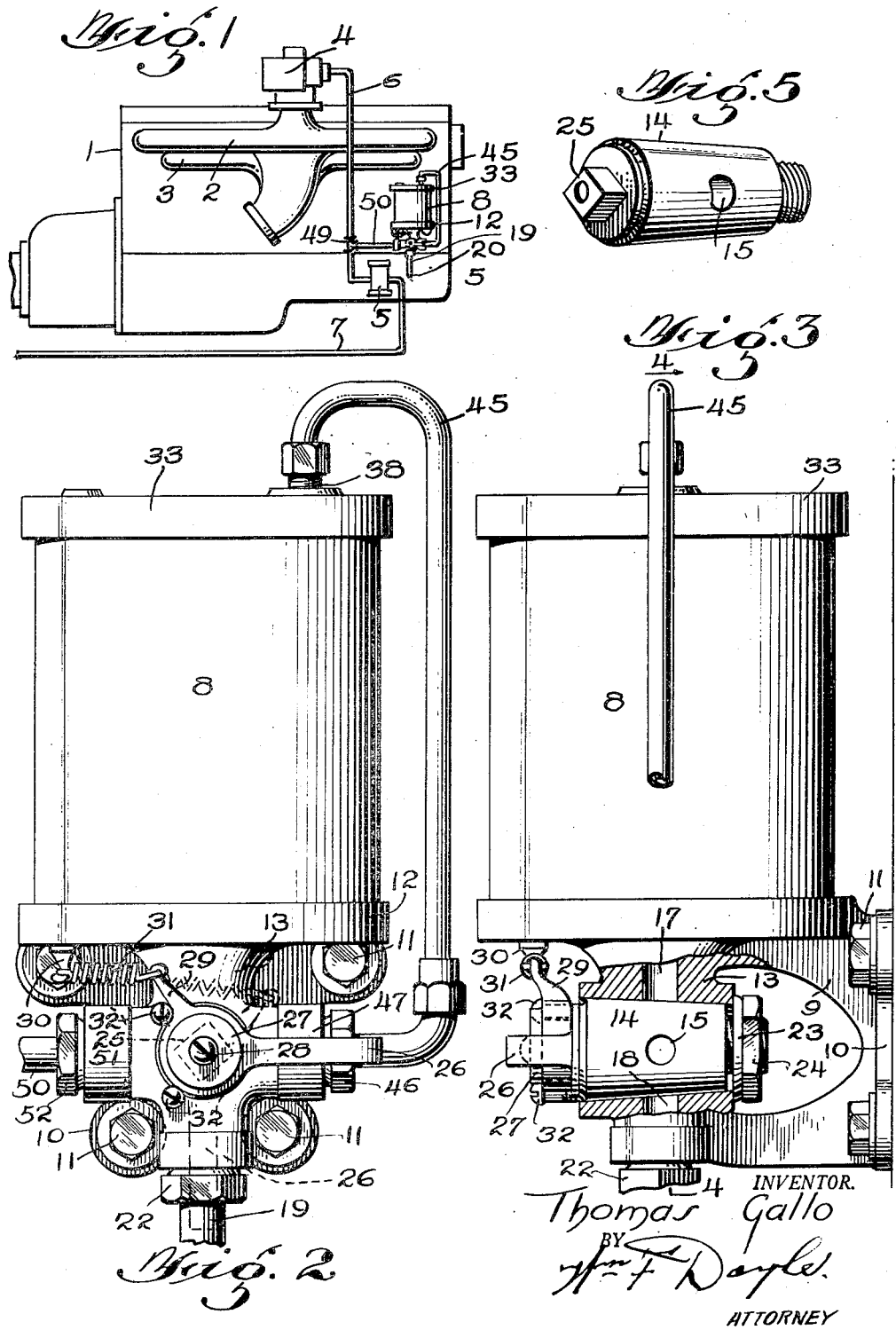

2,370,653

UNITED STATES PATENT OFFICE 2,370,653

DILUTER FOR MOTOR CRANKCASE LUBRICANTS

Thomas Gallo, Arlington, Va.

Application October 26, 1942, Serial No. 463,390

4 Claims. (Cl. 123—196)

(Granted under the act of March 3, 1883, as amended April 30, 1928; 370 O. G. 757)

The invention described herein, if patented, may be manufactured and used by or for the Government for governmental purposes, without the payment to me of any royalty thereon.

This invention relates to diluters for lubricants, and, more particularly, to means whereby the lubricating oil in the crank case of a motor may be diluted with gasoline drawn from the usual supply of fuel to the motor, stored in a receptacle while the motor is being operated in the usual movement of the vehicle and when the vehicle is to be left standing and the motor is not to be operated for some time. Just prior to stopping the motor, said stored fuel is discharged into the crank case, mixes with the lubricant therein, and is forced out into all of the bearings supplied thereby, to enable greater freedom of operation of the parts of the motor when starting under conditions wherein the viscosity of the lubricant in the crank case should be low.

The use of the device disclosed herein is particularly advantageous when the motor vehicle is to be left unoperated over a period of time in cold climate. This device enables a predetermined amount of gasoline to be drawn from the fuel tank of the vehicle, and to be stored and later discharged into the crank case of the motor for the purpose of diluting the lubricant therein. Thus, the lubricant in the crank case, and in all of the bearings supplied from the same, is thinned and its visosity reduced to such an extent the motor may readily be turned over by the battery at a speed sufficient for easy starting.

While a preferred form of the device is herein shown and described, it will be understood that slight changes in form and minor details of construction may be resorted to without departing from the spirit of the invention, or fall beyond the scope of the claims.

Similar numerals indicate corresponding parts in all the figures of the drawings.

Fig. 1 is a side view showing diagrammatically the improved means for diluting the lubricating oil in the crank case of a motor.

Fig. 2 is an enlarged front view of the diluting attachment for motor crank case lubricating oil.

Fig. 3 is a side view, partly in section, of Fig. 2.

Fig. 4 is a vertical sectional view on line 4—4 of Fig. 3.

Fig. 5 is a detailed view of the valve.

Fig. 6 is a detailed view of the valve operating arm.

Fig. 7 is a detailed view of the top plate of the container.

Fig. 8 is a view of a modified length of body portion of the container, for use when the full capacity of a larger container is not required.

Reference now being had to the drawings by numerals, 1 indicates an internal combustion engine, 2 its intake manifold, 3 the exhaust manifold, 4 the carburetor, 5 the fuel pump, 6 the fuel line between the pump and the carburetor 4, 7 the fuel line from the fuel tank (not shown) to the pump 5, all of which are usual equipment and form no part of the present invention.

Mounted on the motor in any preferred position, is the improved diluter consisting of a container 8 of the desired size, form, and material, the body portion of which is open at its upper and lower ends, and is mounted at its lower end in the mounting bracket 9. The bracket is provided with a base 10 secured by bolts 11 to the motor block, and an upwardly extending screw-threaded flange 12, into which the lower end of the body of the container is threaded.

A valve casing 13 is formed as an integral part, or is secured to the bracket 9 in which the valve 14 is mounted, and port 15 extends through the valve. Extending from the interior of the container through the valve casing to the valve is an outlet passage 17, and from the valve a discharge passage 18 extends and is in communication with discharge tube 19, said tube being mounted at its lower end at 20 and being adapted to discharge into the crank case of the motor. Said tube 19 is mounted in an extension 21 of the valve casing in the usual manner by coupling 22.

The valve 14 is held firmly seated by spring 23 and nut 24 at its inner end. At its outer end the valve is squared at 25 and has mounted thereon the valve operating handle 26 held in place by washer 27 and screw 28, the latter being mounted in the squared end 25 of the valve. The valve operating handle 26 has projecting from it an arm 29, an anchor lug 30 depends from the mounting bracket, and connecting said arm and lug is a tension spring 31 adapted to return the valve to its normal position when the operating handle is released by the operator. Stop screws or lugs 32 are mounted in the end of the valve casing to limit the movement of the operating handle. The top of the body portion of the container is closed by top plate 33 having a flange 34 threaded to said body portion. The top plate is provided with a depending guide 35 adapted to receive the stem 36 of an indicator float 37. Threaded through the top plate is the body portion 38 of an automatic needle cutoff valve having a central bore 39, the seat portion, and the valve member 40.

Mounted at 41 on a depending projection 42 of the top plate is a cutoff float 43 and mounted on said float is an arm 44 in contact with the valve member 40, adapted to close the valve and cut off the flow of diluent to the container when it is full. To the upper end of valve member 38 is coupled the filler tube 45, extending down, coupled at 46 to an extension 47 of the valve casing, and in communication with the valve through filling passage 48.

Connected with the engine fuel supply line by a T at 49 between the pump 5 and the carburetor 4 is the filling tube 50 entering the valve casing through extension 51 and coupling 52, forming a communication through filling passage 53 with the valve. A stop lug 42' extending from the depending projection 42 limits the downward movement of float 43 to prevent the separation of the needle valve member 40 from its seat when the container is emptied.

In some localities the range of temperatures do not require the full capacity of the container to accomplish the results desired. To meet such condition, the body or cylindrical portion 8 of the diluter may be made in various lengths and threaded at both ends, and the parts assembled in the manner shown in the drawings, which brings to a lower level in the container the float and the cutoff valve, for the purpose of stopping the flow of the diluent into the container at the desired level.

If, for any reason, for instance, in the summer months when the engine in starting turns over relatively easily as compared to its operation in winter, there may be provided a cutoff valve in the filling tube 50, for throwing the diluter out of operation.

In operation, the container of the diluting mechanism is normally full, the fuel pump, while the motor is running, fills the container in the same manner, and, at the same time that it fills the carburetor, and the cutoff mechanism within the container stops the incoming flow when the liquid has reached the desired level, by the float closing the needle valve. At the end of the day or at a time when the motor will be left standing and not operated for a period that will permit the motor and its crank case lubricant to become chilled, by action of the operator in throwing the valve lever down to a vertical position against the tension of the spring, the contents of the container will be drained into the crank case and be mixed with the lubricant therein. When the valve lever is released, the spring will cause the valve to return to receptacle filling position and the motor will be in condition for easy starting. The next run of the motor will refill the container ready for the next long stop.

The stem 36 of float 37 indicates, when the stem is not showing at the top of the container, that it is empty.

When preparing the motor for an extended stop by releasing the diluent into the crank case, it is desirable to permit the motor to idle for a brief period, such as three or four minutes after all of the diluent reaches the crank case, which will permit the fully diluted lubricant to reach all of the parts of the engine that are lubricated from the crank case.

A split pin 54 passes through the stem 36 of float 37 to prevent the stem extending too great a distance above the top plate when the receptacle is full. The primary purpose of the stem is to indicate, by its concealment, that the tank is empty.

Having described my invention what I claim, and desire to secure by Letters Patent is:

1. The combination with an internal combustion engine having a crank case adapted to contain lubricating oil, a carburetor, a fuel pump, and a fuel supply line through the pump to the carburetor, of means for delivering a diluent to the lubricant in the crank case, comprising a receptacle, a filling tube connecting the fuel line of the engine with a vertically arranged needle valve in the top of the receptacle, means for closing said valve when the fuel in the receptacle has reached a predetermined level, means adapted to be operated manually to discharge the fuel from the receptacle into the crank case, and means for automatically closing said means of discharge when released.

2. The combination with an internal combustion engine having a crank case adapted to contain lubricating oil, a carburetor, a fuel pump, and a fuel supply line through the pump to the carburetor, of means for delivering a diluent to the lubricant in the crank case, comprising a receptacle, a vertically arranged needle valve in the top of the receptacle connected with the fuel line of the engine between the pump and the carburetor adapted to permit fuel to be forced into the receptacle through the needle valve when open, a float arranged within the receptacle connected with the stem of the needle valve adapted to close the valve when the receptacle is full, means for manually discharging the contents of the receptacle into the crank case, and means for automatically closing said means of discharge when released.

3. The combination with an internal combustion engine having a crank case adapted to contain lubricating oil, a carburetor, a fuel pump, and a fuel supply line through the pump to the carburetor, of means for delivering a diluent to the lubricant in the crank case, comprising a receptacle, a float-controlled inlet means arranged in the top of the receptacle, a two-way valve arranged beneath the receptacle, a tube connecting the fuel supply line of the engine between the pump and the carburetor with the two-way valve, a tube connecting the two-way valve and the inlet means, a passage from the base of the receptacle to the two-way valve, and a tube connecting the two-way valve and the crank case, said valve being adapted in its normal position to provide a passage through the valve from the fuel supply line of the engine to the inlet of said receptacle, and in its manually adjusted position to provide a passage through the valve from the receptacle to the crank case.

4. The combination with an internal combustion engine having a crank case adapted to contain lubricating oil, a carburetor, a fuel pump, and a fuel supply line through the pump to the carburetor, of means for delivering a diluent to the lubricant in the crank case, comprising a receptacle, a float-controlled inlet means arranged in the top of the receptacle, a two-way valve arranged beneath the receptacle, a tube connecting the fuel supply line of the engine between the pump and the carburetor with the two-way valve, a tube connecting the two-way valve and the inlet means, a passage from the base of the receptacle to the two-way valve, and a tube connecting the two-way valve and the crank case, said valve being adapted in its normal position to provide a passage through the valve from the fuel supply line of the engine to the inlet of the receptacle, and in its manually adjusted position to provide a passage through the valve from the receptacle to the crank case, and means for indicating the exhaustion of diluent from the receptacle.

THOMAS GALLO.